(12) United States Patent
O'Neill et al.

(10) Patent No.: US 7,044,637 B2
(45) Date of Patent: May 16, 2006

(54) TEMPERATURE MEASURING APPARATUS

(75) Inventors: Terrence J. O'Neill, Lake Geneva, WI (US); Steven Brown, Burlington, WI (US)

(73) Assignee: Quartex a division of Primex, Inc., Lake Geneva, WI (US)

( * ) Notice: Subject to any disclaimer, the term of this patent is extended or adjusted under 35 U.S.C. 154(b) by 0 days.

(21) Appl. No.: 10/933,894

(22) Filed: Sep. 4, 2004

(65) Prior Publication Data

US 2005/0053117 A1   Mar. 10, 2005

Related U.S. Application Data (60) Provisional application No. 60/538,399, filed on Jan. 22, 2004, provisional application No. 60/500,283, filed on Sep. 4, 2003.

(51) Int. Cl.
*G01K 3/04* (2006.01)
*G01K 7/00* (2006.01)

(52) U.S. Cl. .................. 374/102; 374/2; 374/170; 374/109; 374/112

(58) Field of Classification Search ............. 374/2, 374/120, 121, 126, 129, 161, 162, 102, 107, 374/109, 112
See application file for complete search history.

(56) References Cited

U.S. PATENT DOCUMENTS

| | | | |
|---|---|---|---|
| 3,699,339 A * | 10/1972 | Taczak, Jr. ................ 250/353 |
| 3,735,136 A * | 5/1973 | Flint ...................... 250/339.14 |
| 4,387,301 A * | 6/1983 | Wirick et al. ............. 250/252.1 |
| 4,476,373 A * | 10/1984 | D'Antonio ............. 219/121.36 |
| 4,634,292 A * | 1/1987 | Ikeda et al. .................. 374/109 |
| 4,689,483 A * | 8/1987 | Weinberger ............ 250/227.23 |
| 4,881,823 A * | 11/1989 | Tanaka et al. ............... 374/126 |
| 5,183,338 A * | 2/1993 | Wickersheim et al. ...... 374/131 |
| 5,641,419 A * | 6/1997 | Vandenabeele ............. 219/497 |
| 5,954,430 A * | 9/1999 | Turtiainen et al. .......... 374/136 |
| 6,064,066 A * | 5/2000 | Bevan et al. ................ 250/345 |
| 6,409,198 B1 * | 6/2002 | Weimer et al. .......... 250/339.04 |
| 6,772,085 B1 * | 8/2004 | Watkins et al. ............. 702/130 |
| 2002/0011568 A1 * | 1/2002 | Diekmann ............... 250/338.3 |
| 2005/0002435 A1 * | 1/2005 | Hashimoto et al. ........... 374/43 |

FOREIGN PATENT DOCUMENTS

| EP | 0783097 | 7/1997 |
|---|---|---|
| NL | 1002157 C | 7/1997 |

* cited by examiner

*Primary Examiner*—Gail Verbitsky (74) *Attorney, Agent, or Firm*—Michael Best & Friedrich LLP (57) ABSTRACT

A temperature measurement apparatus allows for accurate temperature measurement in both the sun and the shade using two different thermal sensors. A black sensor has an infrared absorbent surface and a white sensor has an infrared reflecting surface. Using the measurements from these two sensors, a series of equations calculate the correct ambient temperature regardless of where the measurement device is located and ensures accurate readings using a performance check system.

12 Claims, 4 Drawing Sheets

TEMPERATURE MEASURING APPARATUS

CROSS-REFERENCE TO RELATED APPLICATIONS

This application claims priority to co-pending U.S. Provisional Patent Application Ser. No. 60/500,283 filed on Sep. 4, 2003, and co-pending U.S. Provisional Patent Application Ser. No. 60/538,399 filed Jan. 22, 2004, both of which are incorporated herein by reference.

BACKGROUND OF THE INVENTION

The present invention relates to temperature measuring devices. Conventional temperature measuring apparatuses or thermometers are often located in an outdoor location, where they are exposed to ambient air, and in many cases, sunlight. Conventional thermometers record a perceived air temperature and present that temperature reading on a display for users of the thermometer to read. Whether or not the thermometer is exposed to sunlight, however, may have an affect on the temperature reading. Users of such thermometers would welcome a thermometer that takes into account environmental conditions (including the effect of sunlight) surrounding the thermometer when displaying temperature information.

SUMMARY OF THE INVENTION

The present invention provides a temperature measuring apparatus comprising a microprocessor, a first temperature sensor linked to the microprocessor and having a relatively high thermal absorbency, and a second temperature sensor linked to the microprocessor and having a relatively low thermal absorbency. The temperatures measured by the first and second sensors can be used by the microprocessor to determine various environmental conditions, including ambient air temperature.

DETAILED DESCRIPTION OF THE DRAWINGS

Figure 1:
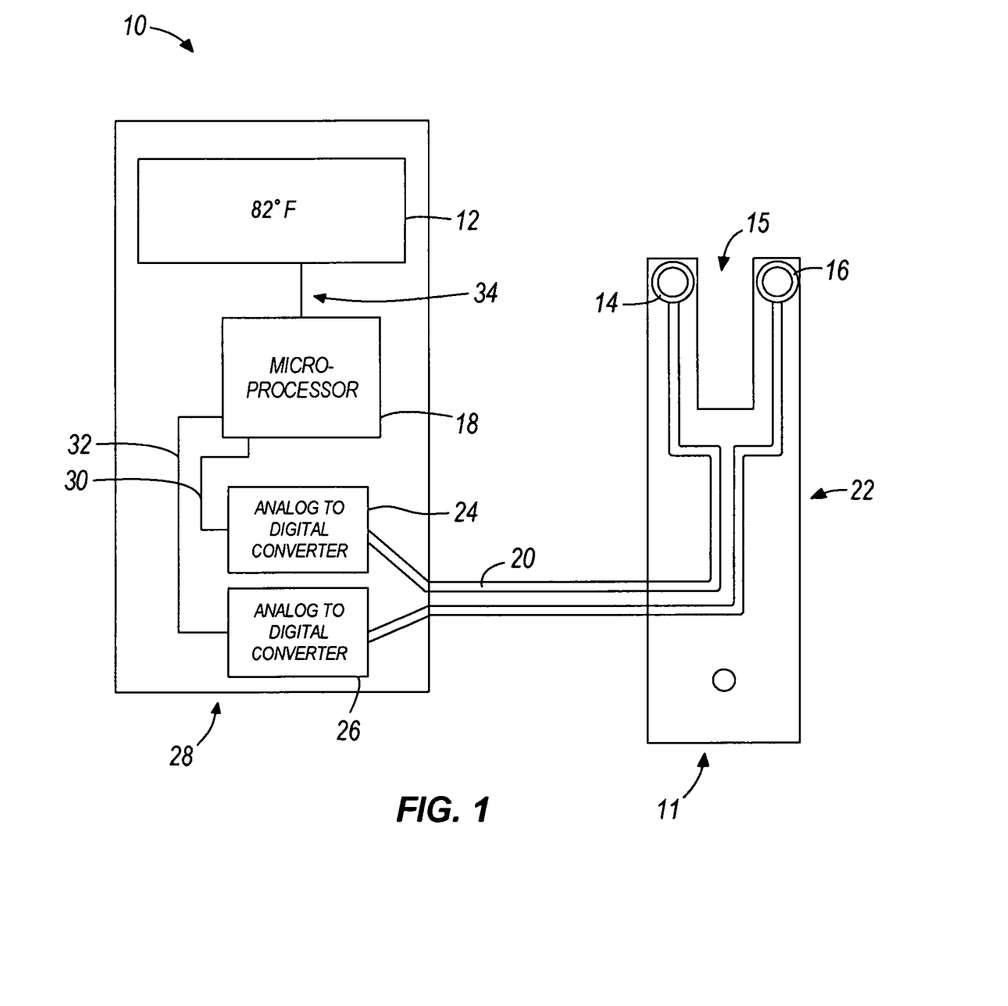
FIG. 1 is a schematic view of the structure of a temperature measuring apparatus according to the present invention.

Referring to FIG. 1, a temperature measuring apparatus 10 according to the present invention includes a thermometer housing 28 linked to a sensor portion 11. In the embodiment of the thermometer 10 shown in FIG. 1, the link between the thermometer housing 28 and the sensor portion 11 is an electrical connection made by connection wires 20. However, as will be readily apparent to those of skill in the art, the link between the housing 28 and the sensor portion 11 could be other than a hard-wired connection. For example, the sensor portion 11 could be linked to the housing 10 through an infrared or other similar non-wired connection known to those of skill in the art.

The sensor portion 11 of the thermometer 10 includes first and second thermal sensors 14 and 16, respectively, that sense temperature information in the environment in which the sensor portion 11 sits. The temperature information read by the sensors 14, 16 is transmitted back to a microprocessor 18 within the thermometer housing 28. Before reaching the microprocessor 18, the temperature information generated by the sensors 14, 16 passes through first and second analog to digital converters 24, 26. The microprocessor 18 uses the temperature information received from the sensors 14, 16 to calculate (as will be discussed below) any of a number of temperature readings (or even other environmental readings) that can then be displayed on a display 12 of the housing 28. The display 12 of the thermometer 10 is shown as a digital display in FIG. 1 and illustratively indicates a temperature reading of 82° F. However, it will be readily apparent to those of skill in the art that the display 12 could be other than digital and will display any of a number of readings (including non-temperature readings) according to the calculations of the microprocessor 18, as discussed below.

The sensor portion 11 of the temperature measuring apparatus 10 includes two thermal sensors (a first 14, and a second 16) that have different thermal absorbencies. The sensors 14, 16 are mounted to a substrate 22 that has a low thermal absorbency and a low thermal conductivity. In the embodiment of the invention shown in FIG. 1, the first sensor 14 is black in color and has a relatively absorbent surface. The second sensor 16 is white in color and has a relatively reflective surface. The sensors are separated by a space 15 that permits good airflow and separability between the sensors 14, 16. Because of the different absorbencies and absorptivities of the first and second sensors 14, 16, the sensors 14, 16 will measure different temperature readings depending on the environmental conditions in which the sensors 14, 16 sit. The microprocessor 18 can be programmed (for example, according to FIGS. 2–5) to use the various readings received by the sensors 14, 16 to make certain determinations about the environment in which the sensors 14, 16 sit and correspondingly generate a reading on the display 12 to reflect those determinations.

For example, if the sensor portion 11 of the thermometer 10 is sitting in the sunlight, the first sensor 14, which is black, will absorb a greater amount of sunlight and convert it into heat energy than the second sensor 16, which is white. The first sensor 14 will, therefore, send a higher temperature reading back to the microprocessor 18 than the second sensor 16. The microprocessor 18 can take these readings and make calculations based on them to generate readings indicating various conditions of the environment in which the sensors 14, 16 sit. For example, as will be explained in more detail below, the readings of the sensors 14, 16 can be used to calculate the ambient air temperature surrounding the sensors 14, 16. In another example, if both sensors 14, 16 are in the shade, their temperature readings may be close in value or even the same. The microprocessor 18 can take in these readings and calculate the ambient air temperature "knowing" that the sensors 14, 16 are in the shade.

In other embodiments (not shown), three or more sensors can also or alternately be used. In still other embodiments (not shown), the sensors 14, 16 can be coated with other coatings having other colors and having different emissivity values. In yet other embodiments (not shown), the sensors 14, 16 can be formed of different materials or in different shapes having different emissivity values and may or may not be coated with different colored coatings. A highly reflective coating could also be used over one or both of the sensors 14, 16 to reduce the effect of sunlight on the measurements of the sensors 14, 16.

There are many factors that can affect the temperature readings measured by the first and second sensors 14, 16. Using these factors in the calculations made by the microprocessor 18 can help to generate and display information regarding the environmental conditions in which the sensors 14, 16 sit. These environmental factors can be determined from the temperature information measured by the sensors 14, 16 (as will be discussed in more detail below), or sensors in addition to sensors 14, 16 could be used to add data to the calculations made by the microprocessor 18 and help generate and display accurate weather information.

FIGS. 2 through 5 illustrate a method of using the temperature readings of sensors 14, 16 to calculate the ambient temperature of the air surrounding the sensor portion 1 of the thermometer 10. Other temperature values or other environmental conditions can be calculated by the microprocessor 18 using the measured temperature values of the sensors 14, 16 and still remain within the scope and spirit of the present invention. For example, the temperature readings measured by sensors 14, 16 can be examined over time by the microprocessor 18 to calculate the number of hours of sunlight for a particular day. That information (non-temperature information) can then be displayed on the display 12 of the thermometer 10.

Figure 2:
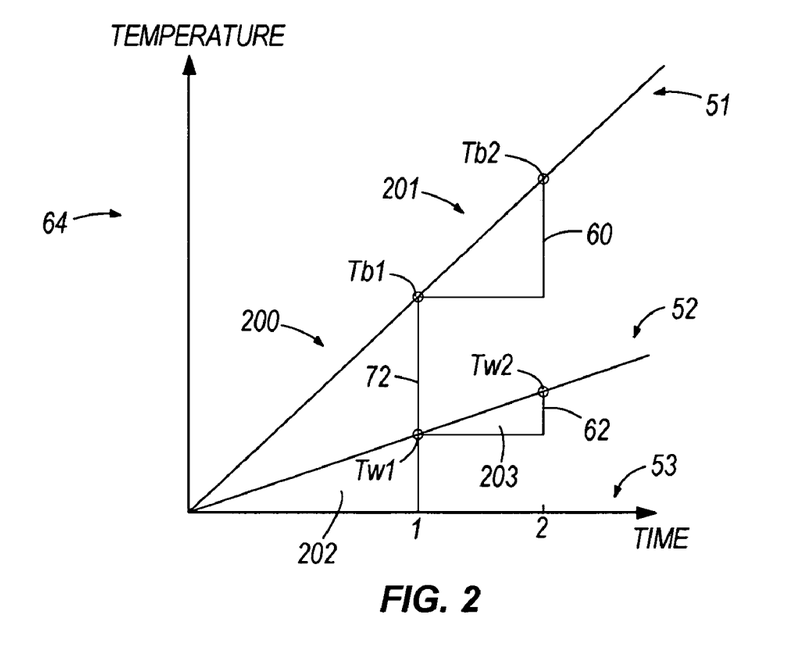
FIGS. 2 and 3 are graphical representations illustrating temperature information measured by the temperature measuring apparatus of FIG. 1 and the methodology for determining ambient air temperature using this information.
Figure 3:
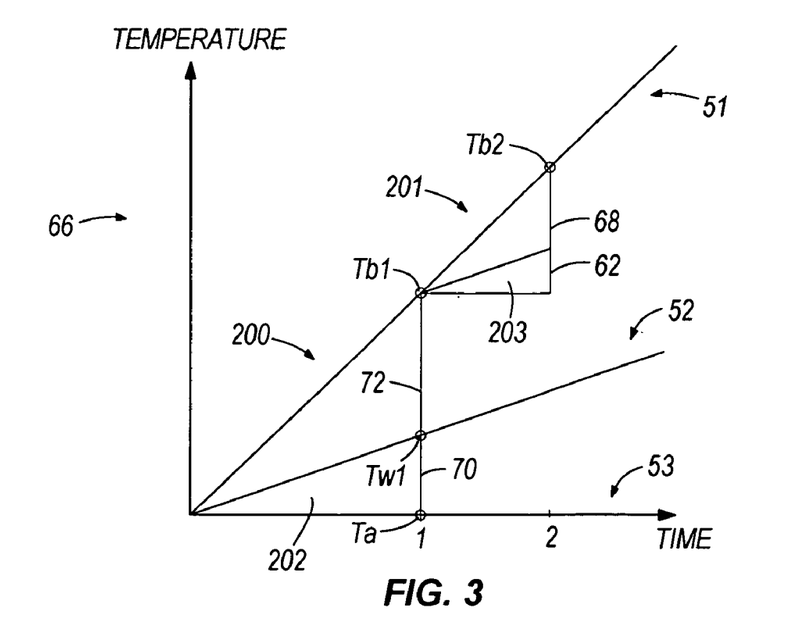

FIGS. 2 and 3 graphically represent temperature information that is measured by the sensors 14, 16 and which can be used to calculate ambient air temperature. Referring to FIGS. 2 and 3, a line 51 is representative of an increase in temperature the black thermal sensor 14 would experience over time and a line 52 is representative of an increase in temperature the white thermal sensor 16 would experience over time as some level of sunlight radiates onto the sensors 14, 16. This plotted temperature information can be used to calculate an ambient air temperature (air temperature without sunlight) according to the equations below wherein the variables used in those equations are as follows:

Ta=air temperature (without sunlight);

Tb1=the temperature of the black sensor 14 in sunlight at a time 1;

Tw1=the temperature of the white sensor 16 in sunlight at time 1;

Tb1−Tw1 (72)=the difference between the temperature of the black sensor 14 and the temperature of the white sensor 16 at time 1;

Tw1−Ta (70)=the difference between the temperature of the white sensor 16 and the air temperature at time 1;

Tb2=the temperature of the black sensor 14 in sunlight at a time 2;

Tw2=the temperature of the white sensor 16 in sunlight at time 2;

ΔTb (60)=the absolute value of the difference of Tb2 and Tb1; and

ΔTw (62)=the absolute value of the difference of Tw2 and Tw1.

A value ΔTb (60) is the relative change in temperature of the black sensor due to sunlight and a value ΔTw (62) is the relative change in temperature of the white sensor due to sunlight from a time 1 to a time 2 as shown in plot 64. A line 53 represents a constant air temperature over time. Although, in actuality, air temperature is constantly changing, a constant air temperature is assumed because the change in outside air temperature is typically relatively slow (e.g., 1 to 10 degrees per hour) compared with the change in temperatures of the sensors 14, 16. The measurements represented in plots 64, 66 are taken within a few minutes of each other (i.e., times 1 and 2 are relatively close together), in which time it can be assumed the air temperature is a relative constant. Therefore, any slight change that may actually occur in the air temperature between times 1 and 2 air is negligible.

With this said, the air temperature without sunlight, Ta, is determined through a series calculations based on proportions that are consistent between similar triangles. As will be readily understood by those of skill in the art, because right triangles 200 and 201 both have hypotenuses that lies on line 51 (i.e., their hypotenuses have the same slope), they are similar. Similarly, triangles 202 and 203 are similar because their hypotenuses lie on line 52. Translating triangle 203 from FIG. 2 into triangle 201 in FIG. 3 makes the relationships between similar triangles 200 and 201 and similar triangles 202 and 203 visually clear in FIG. 3. As will be readily apparent to those of skill in the art, because of the similarities, the ratios of the lengths of the legs of triangle 203 to the lengths of the legs of triangle 201 will be proportional to the ratios of the lengths of the legs of triangle 202 to the lengths of the legs of triangle 200.

ΔTb (60) is now divided into two sections, (ΔTb−ΔTw) (68) and ΔTw (62). A proportional relationship between similar triangles exists such that: (Tw1−Ta)/(Tb1−Tw1)=(ΔTw)/(ΔTb−ΔTw). Solving this equation for Ta (ambient air temperature) yields: Ta=Tw1−(Tb1−Tw1)*(ΔTw)/(ΔTb−ΔTw)=Tw1−(Tb1−Tw1)*K, where K=(ΔTw)/(ΔTb−ΔTw)=ΔTw/Δ(Tb1−Tw1).

The calculations and logic behind the above calculations become more complicated by the fact that the emissivity of the surrounding environment affects the readings of the sensors 14, 16 and the emissivity of the surroundings changes with the location of the sensors 14, 16, with changes in seasons, and with the deterioration of or changes in the absorbing surfaces of the sensors 14, 16. The more of these factors that are taken into account, the more accurate the calculated values can be.

As mentioned, it is possible to determine environmental factors other than just temperature using the sensors 14, 16. The environmental conditions surrounding the sensors 14, 16 all affect each other. With this in mind, an examination of the changes in temperature over time of the sensors 14, 16 can provide information about the environment other than just temperature. By monitoring the temperature dynamics, particular temperature readings can be selected to determine the environmental conditions surrounding the sensors 14, 16 and correspondingly adjust the displayed temperature readings according to those conditions or to display information regarding those environmental conditions themselves. For example, some environmental conditions that can be gleaned from an examination of temperature dynamics are as follows:

1. Air temperature:

The air temperature outdoors typically changes at a rate of about 1° F. to about 10° F. per hour. Therefore, a change in reading of sensors 14, 16 of about 3° F. or more in 1 to 2 minutes would most likely be due to some cause other than just a change in air temperature. Air temperature influences the temperatures recorded by the two sensors 14, 16, but it is not the cause for a difference in readings between the two sensors 14, 16.

2. Wind:

At night, when there is no sunlight, the wind has a negligible effect on the temperature of the sensors 14, 16. However, the wind can have a significant effect on the temperature of the sensors 14, 16 when the sun is shining. If the sensing probes 14, 16 are in sunlight, then the wind effectively reduces the temperature recorded by the sensors 14, 16 in relation to the wind speed, air temperature, and the temperature of the sensors 14, 16. The cooling effect of wind on the sensors 14, 16 is a method that can be used to determine wind speed. Also, whether the sensing elements 14, 16 are in the sun or in shade, the wind can still effect them by blowing air from another source, such as, for example, from a hot, sun-heated, parking lot or wall to the sensors 14, 16. In the case where the sensors 14, 16 are in the shade, both sensors 14, 16 will change by the same amount; in the case where the sensors 14, 16 are in the sun, the change will be proportional to their original differences in temperature readings.

3. Solar radiation:

Because the sensors 14, 16 are relatively small and because the sensors 14, 16 are somewhat thermally isolated from a larger mass, their thermal response to changes in solar radiation is rapid, often occurring within a few minutes. Temperature changes caused by solar radiation are typically between about 5° F. to about 25° F. under normal atmospheric conditions.

4. Environmental Absorbtion/Reflection of Solar Radiation:

A portion of the solar radiation that reaches the sensors 14, 16 is reflected from the environment. The environment also alters both the amount and the composition of the solar radiation by absorbing and converting some wavelengths to heat (infrared), and reflecting other wavelengths. This affects both the magnitude of the temperature increase of the two sensors 14, 16, and the relative difference of their increases. Furthermore, the environmental conditions are not constant, but they are dynamic and change with the seasons as well as other factors.

A specific example describing the effect of the surrounding environment is as follows:

If the sensors 14, 16 are placed in a white environment, then the white environment reflects much of the red, yellow, and blue light from the visible sunlight spectrum and absorbs the infrared radiation. The black sensor 14 absorbs much of the reflected light that strikes it and the white sensor 16 reflects most of the reflected light that strikes it, causing a significant temperature rise in the black sensor 14 and causing a slight rise in the white sensor 16.

Alternatively, if the sensors 14, 16 are placed in a black environment, the black environment absorbs most of the sunlight and converts it to heat. In this manner, the black environment radiates predominately infrared radiation to the sensors 14, 16. Thus, the reflected (re-radiated) light causes the temperatures recorded by both the black and white sensors 14, 16 to rise about the same amount. Therefore, a white environment increases the amount of the red, yellow, and blue light striking the sensors 14, 16 and a black environment increases the infrared radiation reaching the sensors. In both cases, the total amount of sunlight that reaches the sensors 14, 16 is altered.

As discussed above, for the temperature measuring apparatus 10 to give consistently accurate readings, it can be programmed to adjust to its surrounding conditions. Because the temperature measuring apparatus 10 has two thermal sensors 14, 16 and because the factors that affect their temperatures also affect the temperature dynamics differently, it is possible to determine the influence of the various elements affecting the thermal sensors 14, 16 by monitoring the sensor dynamics. Once the environmental influences are determined, then the equations can be adjusted for the environmental influences.

In the temperature measuring apparatus equation [Air temperature=(TW)−(TB−TW)×(K)], TW (temperature of the first or white sensor 14) and TB (temperature of the second or black sensor 16) are measured values. Since the two sensors 14, 16 may be the only means of sensing changes in the environment, they may also be used to determine the appropriate value for "K". To make the equation a dynamic equation that adjusts for environmental conditions, a value "K" is calculated. The value K is based on measured values (TW and TB) of the first and second sensors 14, 16, rather than assuming a constant value based on the relative emissivity values of the two sensor surfaces 14, 16. Although, a value K based on emissivity is appropriate for use as a default value until one can be calculated. The value K is equal to the change in temperature of the first sensor 14 caused by variations in sunlight, divided by the change in temperature of the second sensor 16, minus the change in temperature of the first sensor 14 that was caused by variations in sunlight. Not all sensor readings can be used to determine the value K. In fact, only a small percent of the readings can be paired and used for calculating the value K.

To select the appropriate paired temperatures for calculating the value K, each set of temperature readings can be checked to verify that the measured values and the previous set of temperature readings all meet the following (or similar) parameters that are characteristic of a change that is caused by sunlight and not some other cause.

Some of the checks or requirements are as follows:
1. The readings should be taken at a time interval that is approximately equal to the thermal time constant of the sensor probes. This is approximately 1 to 2 minutes for the illustrated embodiment of the invention.
2. The absolute value of the difference between the previous and present black sensor readings minus the absolute value of the difference between the previous and present white sensor readings is greater than 1° F.
3. The absolute value of the difference between the black sensor reading and the previous black sensor reading is greater than 2° F.
4. The black sensor reading cannot be lower than the white sensor reading. Of course, as mentioned, the sensors do not need to be black and white. According to the present invention they need only have different emissivity values. Further, other or different checks than the four mentioned above could be used.

The above selection process selects the appropriate temperature readings for calculating the K value. However, variations that are caused by other sources also occur during these times. Fortunately, these other variations are cyclic in nature, so, although they cause the individual readings to be higher or lower than their true value, their effect on an accumulated average or mean is negligible. For this reason, averages are used to determine the value K. The accuracy of the value K is determined by the number of readings that are averaged. The ability of the temperature measuring apparatus 10 to adjust to surrounding conditions is also affected by the number of readings that are averaged, so there is a balance between the speed at which temperature measuring apparatus 10 responds to environmental changes to its environment and the stability of the value K.

Figure 4:
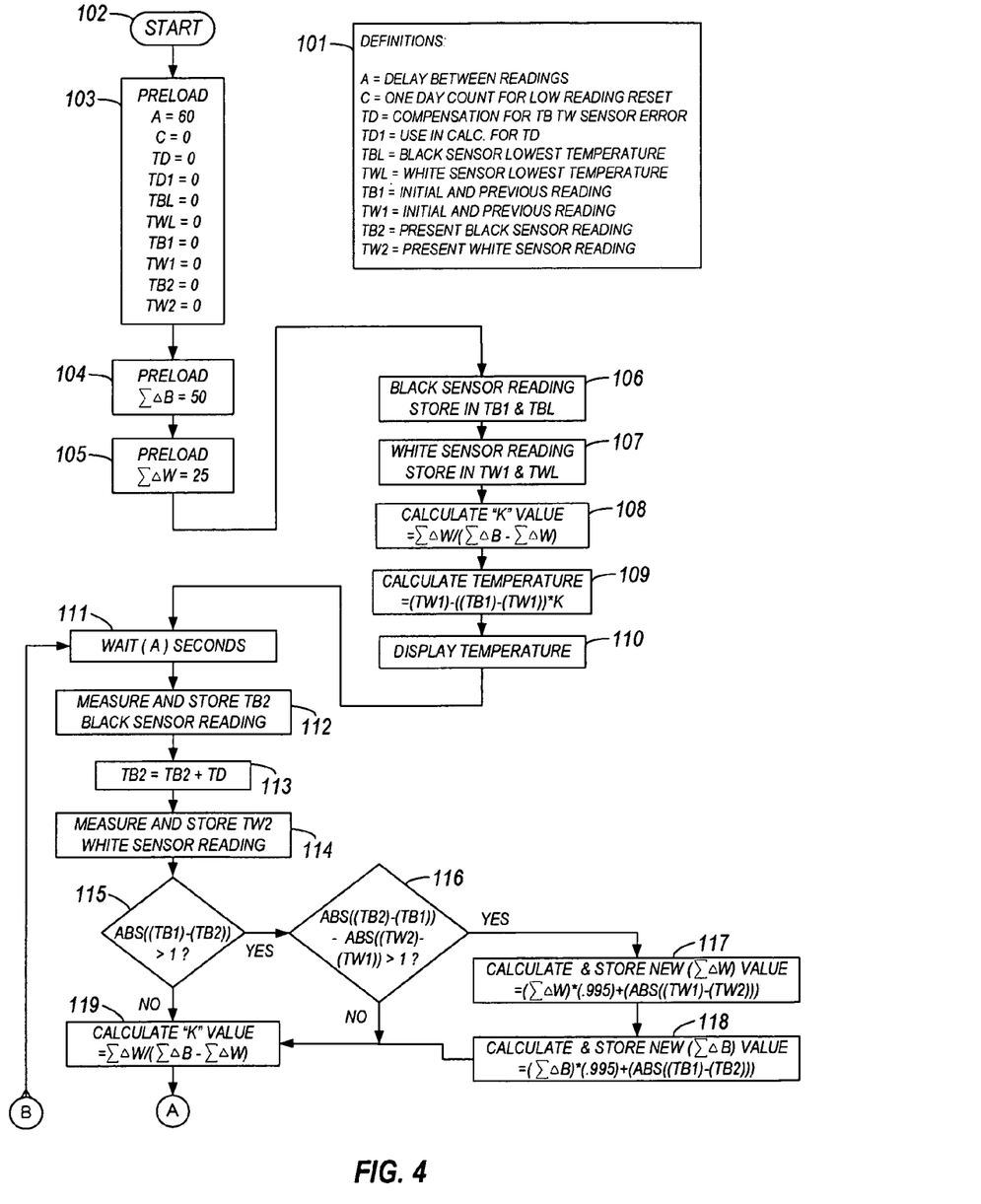
FIGS. 4 and 5 are a flow chart detailing a method for calculating temperature accounting for various environmental considerations according to the present invention.
Figure 5:
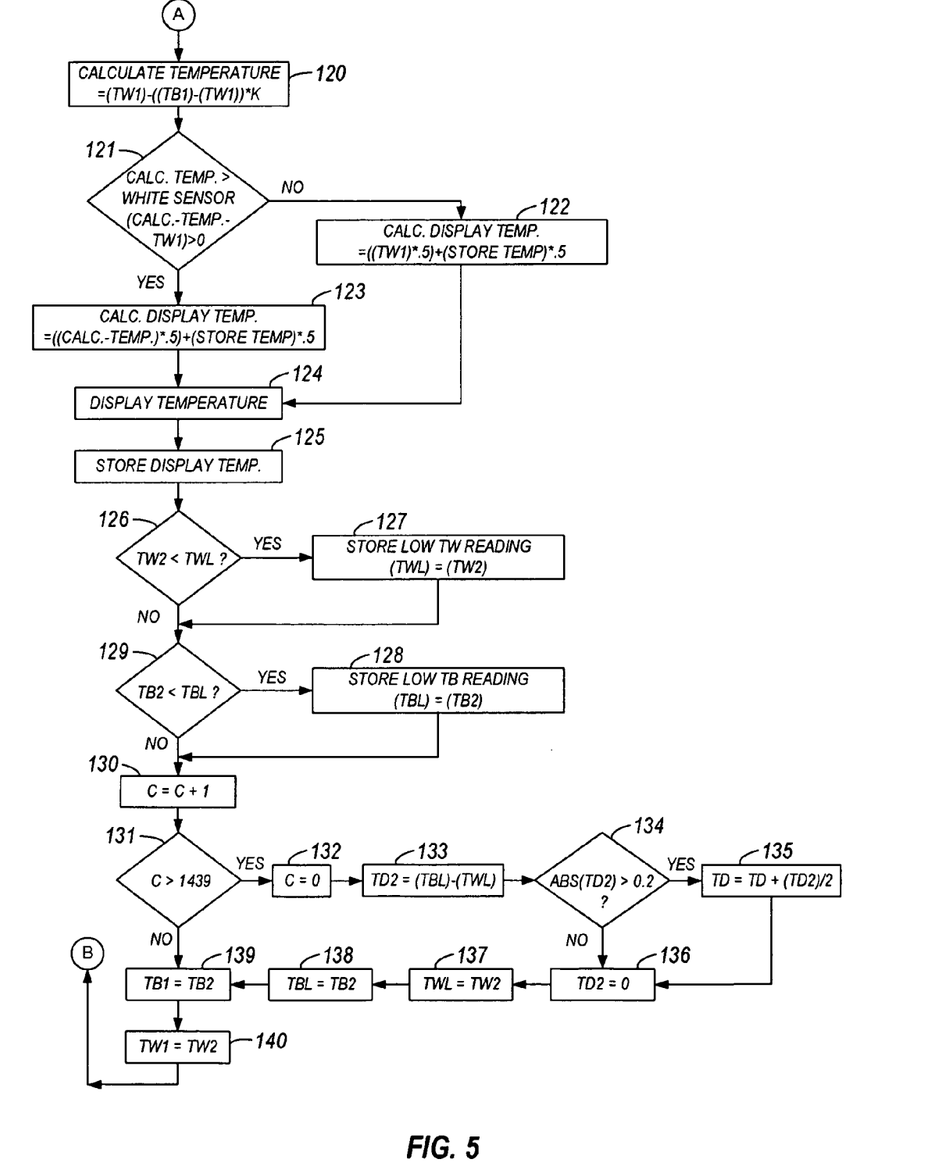

Many examinations can be made to attempt to gather information about the environment in which the sensors 14, 16 sit. The more accurately certain environmental conditions can be determined, the more accurately others can be determined (the environmental conditions all affect each other). FIGS. 4 and 5 provide a flow chart showing a methodology according to the present invention of calculating ambient air temperature, taking into consideration certain environmental factors. The microprocessor 18 of the temperature measuring apparatus 10 according to the present invention calculates ambient air temperature according to the flow chart shown in FIGS. 4 and 5. However, other methodologies that include more or less calculations to account for environmental conditions could be used. And, measurements other than air temperature could be displayed on display 12.

FIGS. 4 and 5 illustrate a methodology according to the present invention used by the microprocessor 18. Definitions of variables used in FIGS. 4 and 5 are shown in a box 101. A step 102 initiates the system when inserting a battery, turning a switch, or pressing a reset button. Step 103 clears the existing data of the sensors 14, 16 from the registers, and sets all initial variables to zero except for "A". "A" is the number of seconds between readings and is typically set to values between 60 and 120 seconds. A step 104 and a step 105 identify the preset values to determine the initial "K". The ratio between these two numbers are determined by the emissivity of the surfaces of the two sensors 14 and 16. Lower numbers, as shown, enable the thermometer 10 to adjust faster to its environment, but will provide slightly greater volatility in initial readings. A step 106 takes an initial reading for the black sensor 14 and stores the value of the lowest reading, the initial reading, and the previous reading of the black sensor 14. A step 107 takes an initial reading for the white sensor 16 and stores the value of the lowest reading, the initial reading, and the previous reading of the white sensor 16. A step 108 calculates a "K" value using the stored values from steps 106 and 107. The value "K" is then used in a step 109 to calculate the air temperature "Ta". In step 110, the air temperature is then displayed on the digital display 12.

A time delay between readings is implemented in step 111, using the preset value of "A" as set in step 103. After waiting "A" seconds, in step 112, the temperature reading of the black sensor 14 is then measured and stored at time 2. A step 113 compensates for the difference between the white sensor 16 readings and the black sensor 14 readings, when both sensors 14 and 16 show approximately the same temperature reading. A step 114 measures and stores the temperature reading for the white sensor 16 at the time 2.

Step 115 is a test to see if the change in temperature of the black thermal sensor 14 is greater than 1 degree Fahrenheit within "A" amount of seconds. If "YES," a step 116 is initiated to test if the absolute value of the change in temperature of the black sensor 14 from time 1 to time 2, less the absolute value of the change in temperature of the white sensor 16 from time 1 to time 2 is greater than one. If "YES," a step 117 calculates a new value for the white sensor 16 and stores a new emissivity value. A step 118 calculates a new value for the black sensor 14 and stores a new emissivity value for the black-sensor 14. A step 119 follows in which the value of "K" is calculated.

In the case that step 115 returns a value that is not greater than one, the system immediately defaults to step 119 to calculate the value of "K". In the case that step 116 returns a value that is not greater than one, the system immediately defaults to step 119 to calculate the "K" value.

Steps 115 and 116 are in place to eliminate most data when the sun is not shining on the sensor and data where the sensor has adjusted to the sunlight and the intensity of the sunlight has remained about the same over a period of time. The checks in steps 115 and 116 are also in place to eliminate most sensor readings except those when there has been a significant increase or decrease in the amount of sunlight. For these readings to accurately reflect the slopes of each sensor line 51 and 52 of FIGS. 2 and 3, the thermal response time constant of the black and white sensors must be the same such that both sensors maintain the same relative temperature change ratio as they respond to variations in sunlight. Steps 117 and 118 are used to determine the individual temperature reading to be displayed.

By using by using the absolute value (abbreviated ABS) of the changes in "TB" and "TW" and then adding the individual readings, it is possible to achieve greater accuracy of the ratios for the changes and to more accurately determine the value "K". Also, by removing a small percentage from the sum or accumulated value (e.g. ½%) every time a new value is added, it is possible to obtain a dynamic value for the value "K" that will change with the sensor's environment. By increasing or decreasing the percentage, it is possible to increase or decrease the rate at which the value "K" will adjust to changes in its environment.

Turning to FIG. 5, a step 120 goes through the set of equations used to calculate air temperature using the value of "K" found in step 119. A step 121 is a check to determine if the calculated temperature from step 120 is greater than the value of the white sensor 16. If "NO," the display temperature is calculated using the given equation in step 122. If "YES," the display temperature is calculated using the given equation in step 123. Step 122 and step 123 then move to step 124 to display the temperature on the digital display 12. A step 125 stores the display temperature. A step 126 is a check to determine if the white sensor 16 lowest value is greater than the most recent white sensor 16 recorded value. If the most recent white sensor 16 recorded value is less than the white sensor 16 lowest value, then a step 127 is in place to reassign the white sensor 16 lowest value to the most recent white sensor 16 recorded value. A step 129 is a check to determine if the black sensor 14 lowest value is greater than the most recent black sensor 14 recorded value. If the most recent black sensor 14 recorded value is less than the black sensor 14 lowest value, then a step 128 is in place to reassign the black sensor 16 lowest value to the most recent black sensor 14 recorded value.

A step 130 counts readings, and is in part counting minutes to determine the next day. A step 131 is a check to determine if an entire day has been completed. For example, assuming "A" is equal to 60 seconds, if the count is less than the amount of minutes per day, 1440, then the most recent black sensor 14 temperature, TB2, is reassigned a value of TB1 in a step 139. The most recent white sensor 16 temperature, TW2, is reassigned a value of TW1 in a step 140 if the count is less than the amount of minutes per day. The cycle is repeated as the process goes back to step 111.

In step 131, if it is determined that a day has finished, the count is brought back to zero in a step 132. For accurateness of the present invention, both sensors 14, 16 should be accurate within a desired range and they should also track each other accurately through the entire temperature range. To assure that the sensors 14, 16 are properly tracking each other, the lowest readings are checked on daily basis and if they are not within a specified value of each other, then the value of the black thermometer will be adjusted to compensate for the difference between the two sensors, as is displayed in steps 133–138. A step 133 determines the difference between the lowest black sensor 14 value and the lowest white sensor 16 value. A step 134 determines if the absolute value of the difference between the lowest black sensor 14 value and the lowest white sensor value 16 is greater than 0.2. If "YES," a formula for determining the new value for "TD" is calculated in a step 135. If the absolute value of TD2 as found in step 134 is less than 0.2, then TD2 is reset to zero in a step 136. A step 137 resets the lowest white sensor 16 temperature to be the most recent white sensor reading, and a step 138 resets the lowest black sensor 14 temperature to be the most recent black sensor reading. Steps 139 and 140 are then initiated and the process begins again for a new day at step 111.

This invention lends itself to other applications such as displaying the hours of sunlight and sunlight temperature, which could be valuable information for a person growing crops or engaging in outdoor activities. This invention can also be used to improve the accuracy of a thermometer that is always in the shade, because even in the shade, the thermometer sensors will experience infrared radiation and reflected sunlight from the areas where the sun is shining. This causes the thermometer's temperature readings to vary with sunlight and read above the actual shade temperature when the sunlight is shining on the surrounding area. Other uses of this invention include forecasting certain weather conditions such as frost, cold fronts, and cloud cover, and for accumulating and displaying a more accurate picture of weather conditions, trends, and warnings. A clock can also be incorporated into the temperature measuring apparatus.

The invention claimed is:

1. A temperature measuring apparatus comprising:
   a microprocessor;
   a first thermal sensor linked to the microprocessor and having a relatively high thermal absorbency; and
   a second thermal sensor linked to the microprocessor and having a relatively low thermal absorbency,
   wherein the microprocessor is configured to receive from each of the first and second sensors a first temperature reading and a second temperature reading, the first temperature reading being indicative of a temperature sensed at a first instant of time, the second temperature reading being indicative of a temperature sensed at a second subsequent instant of time, and
   wherein the microprocessor is further configured to determine at least one environmental condition based on the relative change in temperature sensed by the first sensor from the first to the second instant of time, and based on the relative change in temperature sensed by the second sensor from the first to the second instant of time.

2. The temperature measuring apparatus of claim 1, wherein the first sensor has a coating that is colored with a relatively high thermal absorbency color and the second sensor has a coating that is colored with a relatively low thermal absorbency color.

3. The temperature measuring apparatus of claim 2, wherein the first sensor has a black coating and the second sensor has a white coating.

4. The temperature measuring apparatus of claim 2, wherein the first sensor has a red coating and the second sensor has a white coating.

5. The temperature measuring apparatus of claim 1, wherein the at least one environmental condition comprises ambient air temperature.

6. The temperature measuring apparatus of claim 1, wherein the at least one environmental condition comprises a sunlight condition.

7. The temperature measuring apparatus of claim 6, wherein the sunlight condition is sunlight temperature, and wherein the at least one environmental condition further comprises a temperature humidity index.

8. The temperature measuring apparatus of claim 1, wherein the at least one environmental condition comprises a weather-related warning.

9. The temperature measuring apparatus of claim 1, further comprising a clock.

10. The temperature measuring apparatus of claim 1, wherein the microprocessor is further configured to determine the one of the first sensor and the second sensor that has a higher thermal absorption.

11. A temperature measuring apparatus comprising:
    a microprocessor;
    a display linked to the microprocessor; and
    at least two sensors including a first thermal sensor and a second thermal sensor,
       the first sensor being linked to the microprocessor and having an absorbency, and
       the second sensor being linked to the microprocessor and having an absorbency different from the absorbency of the first sensor,
    wherein the microprocessor is configured to receive from each of the first and second sensors a first temperature reading and a plurality of subsequent temperature readings, the first temperature reading being indicative of a temperature sensed at a first instant of time, the subsequent temperature readings being indicative of respective temperatures sensed at subsequent respective instants of time,
    wherein the microprocessor is further configured to selectively use the received temperature readings to determine at least one environmental condition, based at least in part on temperatures sensed by the first sensor at the first and a subsequent instant of time, and on temperatures sensed by the second sensor at the first and a subsequent instant of time,
    wherein the microprocessor is further configured to determine weather-related summary information associated with the at least one environmental condition, and
    wherein the display is configured to display the at least one environmental condition and the weather-related summary information.

12. A temperature measuring apparatus comprising:
    a microprocessor; and
    at least two sensors including a first thermal sensor and a second thermal sensor,
       the first sensor being linked to the microprocessor and having a relatively high thermal absorbency, and
       the second sensor being linked to the microprocessor and having a relatively low thermal absorbency,
    wherein the microprocessor is configured to receive from each of the first and second sensors a first temperature reading and a second temperature reading, the first temperature reading being indicative of a temperature sensed at a first instant of time, the second temperature reading being indicative of a temperature sensed at a second subsequent instant of time,
    wherein the microprocessor is further configured to determine a plurality of environmental conditions based on the relative change in temperature sensed by the first sensor from the first to the second instant of time, and based on the relative change in temperature sensed by the second sensor from the first to the second instant of time, and
    wherein the plurality of environmental conditions include ambient air temperature.

* * * * *

UNITED STATES PATENT AND TRADEMARK OFFICE
CERTIFICATE OF CORRECTION

| | |
|---|---|
| PATENT NO. | : 7,044,637 B2 |
| APPLICATION NO. | : 10/933894 |
| DATED | : May 16, 2006 |
| INVENTOR(S) | : Terrence J. O'Neill and Steven Brown |

It is certified that error appears in the above-identified patent and that said Letters Patent is hereby corrected as shown below:

Col. 3, line 15: reference numeral "1" should be "11"

Col. 4, line 22: "(Th1-Tw1)=" should be "(Tb1-Tw1)="

Signed and Sealed this

Fifteenth Day of August, 2006

JON W. DUDAS
*Director of the United States Patent and Trademark Office*